No. 880,727. PATENTED MAR. 3, 1908.
R. M. FRANKLIN.
TRAP FOR CRUSTACEA.
APPLICATION FILED MAR. 15, 1907.
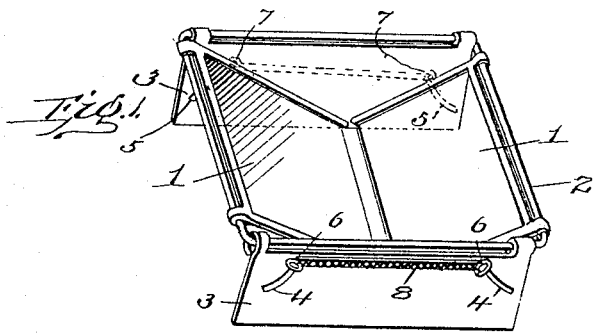
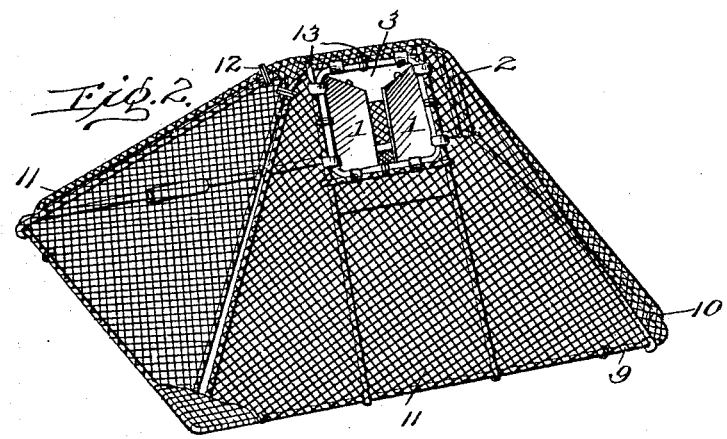
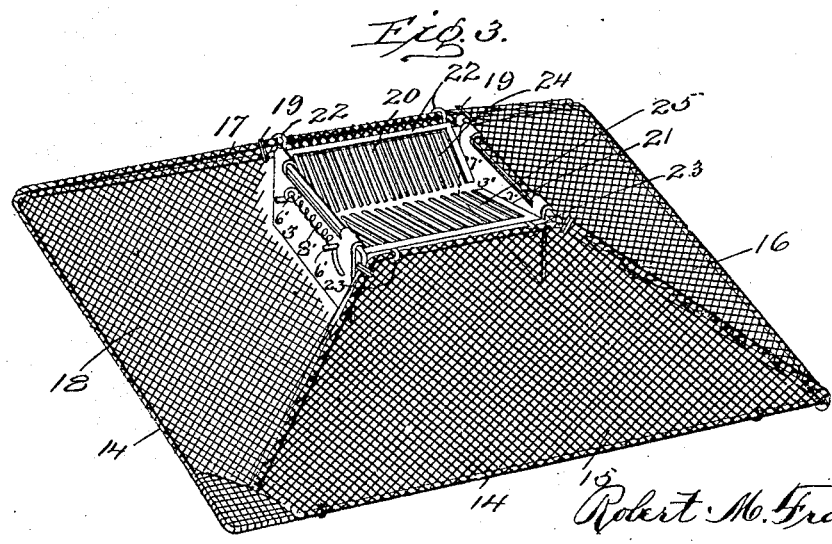
Inventor
Robert M. Franklin
Witnesses
By
Mason Fenwick & Lawrence Attorneys

UNITED STATES PATENT OFFICE.

ROBERT M. FRANKLIN, OF GALVESTON, TEXAS.

TRAP FOR CRUSTACEA.

No. 880,727.     Specification of Letters Patent.     Patented March 3, 1908.

Application filed March 15, 1907. Serial No. 362,515.

*To all whom it may concern:*

Be it known that I, ROBERT M. FRANKLIN, a citizen of the United States, residing at Galveston, in the county of Galveston and State of Texas, have invented certain new and useful Improvements in Traps for Crustacea; and I do hereby declare the following to be a full, clear, and exact description of the invention, such as will enable others skilled in the art to which it appertains to make and use the same.

This invention relates to improvements in traps and particularly to traps and inlet mechanism therefor for catching crustacea.
The invention comprises the production of a framework or housing, and an improved door therefor that is adapted to be opened by the crabs, lobsters, or other crustacea endeavoring to enter the housing.
The invention further comprises a door for a trap housing having pivotally mounted doors, means for normally holding the doors closed, and plates formed with guiding means for guiding and limiting the movement of the doors.

The object in view is the production of a trap having a housing and an entrance therefor that is closed by pivotally mounted doors designed to be normally held closed, but that may be easily operated by a crustacean entering the trap.

Another object in view is the production of a plurality of doors of glass, and elastic means for normally holding the doors in a closed position.

A still further object in view is the production of a folding trap provided with an opening for a removable door, which is designed to be secured thereto, and for normally being held closed but adapted to yield to pressure from the outside.

With these and other objects in view, the invention comprises certain novel constructions, combinations and arrangements of parts as will be hereinafter more fully described and claimed.

In the accompanying drawings:—Figure 1 is a perspective view of a pair of doors and framework therefor, together with the various mechanism for holding the same in proper position. Fig. 2 is a perspective view of a folding or collapsible housing provided with a removable door or closure in one side thereof. Fig. 3 is a perspective view of the truncated pyramidal shaped collapsible housing provided with a slightly modified form of closure or doors in the top thereof.

In the construction of traps for lobsters, crabs and other crustacea, it has been found inconvenient to carry very large traps from place to place, and consequently various devices have been devised that are adapted to be folded more or less, and it is to this class of devices that the present invention relates.

This invention also relates to an improved door that may be also collapsed and packed in a compact form.

In the drawings, 1—1 indicates a pair of glass doors pivotally mounted to a frame 2. The frame 2 may be made of any desired shape, but for the purpose of illustration I have shown the same substantially square. Pivotally mounted to the frame 2 at the ends of doors 1—1 are pivotally mounted guiding plates 3—3. The guiding plates 3—3 are provided with apertures 4—4 and 5—5 for accommodating pins 6—6 and 7—7. The pins 6—6 and 7—7 are provided with suitable heads on their outer end for preventing the same from slipping through slots 4—4 and 5—5. Slots 4—4 and 5—5 are struck on an arc of a circle taking for a center a point registering with the pivotal point of doors 1—1. The pins 6—6 and 7—7 are rigidly secured to doors 1—1 and when the doors are moved, pins 6—6 and 7—7 move in their respective slots or apertures. A suitable tension member as 8 connects pins 6—6 and also 7—7 so as to normally hold the doors 1—1 in a closed position, but always in condition for being forced open. The elastic members 8 are preferably made from rubber, but may be made from springs if desired. The frame 2, together with doors 1—1 and side members 3 is, in operation, placed in a framework or housing as disclosed, for instance, in Fig. 2.

The housing in Fig. 2 is formed with a base frame 9 to which is pivotally secured end pieces 10—10 and side pieces 11—11. I preferably make these pieces 10—10 and 11—11 somewhat pointed so that the same will form a pyramidal shaped housing when they are secured together by tie members 12. An opening is left in one of the side members 11 for receiving the framework 2 and the doors and other mechanism secured thereto. In providing a trap for fish, I preferably position the frame 2 in such a position as to have the doors 1—1 almost in a vertical plane. The frame 2 is secured to the side member 11 in any convenient way as by tie members 13. When constructing the trap for crabs and lobsters, I preferably use a truncated pyramidal shaped housing as disclosed in Fig. 3 and may use the glass doors as disclosed in Fig. 1, or a slightly modified form of doors seen in Fig. 3. The truncated housing seen in Fig. 3 is constructed similarly to the housing seen in Fig. 2, except that the four sides are made substantially alike, and are not brought to a complete point at the upper end so as to form a substantially square opening at the top.

As clearly seen in the drawings, the truncated housing shown in Fig. 3 is provided with a base member or rod 14 that passes entirely around the housing and has pivoted thereto side members 15, 16, 17 and 18 constructed substantially alike. The side members 15, 16, 17 and 18 are tied together near their upper end by suitable tying members as 19 which may be of any ordinary cord or wire as may be desired.

The modified form of door shown in Fig. 3 may be made with a frame 2 seen in Figs. 1 and 2, and mounted directly upon the top of the side members 15, 16, 17 and 18. For the sake of illustration I have simply mounted the doors and surrounding mechanism on the tops of side members 15, 16, 17 and 18. The doors 20 and 21 are pivotally mounted at 22, 22 and 23, 23 to side members 15 and 17 respectively. The doors 20 and 21 are provided with a plurality of fingers 24 and 25 that have their ends brought into proximity to each other when the doors are in their normal or closed position. The fingers 24 and 25 are rigidly secured in place in relation to each in a frame 24', but are adapted to be moved inward by a slight pressure from above so that when a crab or lobster rests upon the doors the same may open and permit the crab or lobster to enter. Guiding plates 3' are provided similar to guiding plates 3—3 found in Fig. 1. They are also provided with suitable pins 6'—6' and 7'—7' which are connected by any suitable elastic means as springs, as 8', for normally holding the doors 20 and 21 in their closed position, the pins being rigidly secured to the doors for communicating power through suitable slots in guiding plates 3'—3' from springs 8'.

When it is desired to move the trap from one place to another the framework 2 is preferably removed and the securing members or cords are removed and the trap folded into a compact body. After the trap has been brought to the location desired it is again set up and put in position and then lowered in place. As heretofore stated the frame 2 with glass doors 1—1 may be used in the truncated pyramidal shaped trap disclosed in Fig. 3, or the doors having fingers 24 and 25 as may be desired. If glass doors are used in a trap designed for catching crabs and lobsters, the crabs or lobsters will rest or press against the doors not thinking the same are there, but believing the passageway to be free and unobstructed and consequently will enter the trap and the doors will close after them.

In forming a trap the sides are preferably made from open work shown and described, either of cordage or of wire, but the bottom may be made either of wire or a solid substance, as may be desired. I preferably use wire as the same will hold the crustacea in the trap and yet provide an easily constructed bottom as well as an inexpensive bottom.

The bottom may be made of an independent piece and secured in place by suitable tying members, or may have a wire or cordage strung from one side of the frame to the other.

Having thus fully described my invention, what I claim as new and desire to secure by Letters Patent is:—

1. A device of the character described, comprising a collapsible frame, means for securing the same together in an assembled condition, doors secured to said frame, and elastic means secured to said doors for holding the doors normally closed.

2. A device of the character described, comprising a housing, a plurality of doors removably secured to said housing, and guiding plates for limiting the movement of said doors.

3. A device of the character described, comprising a housing, a plurality of doors pivotally mounted therein, guiding plates for limiting the movement of said doors, and means for normally holding said doors in a closed position.

4. A device of the character described, comprising a trap body formed with an opening, an inlet frame secured in said opening, a plurality of doors oppositely mounted on said frame and capable of adjustment to swing inwardly into the body of the trap, elastic means connecting said doors and normally holding them in a closed position, guard plates to close the openings at either side of the swinging doors, and stops to limit the movement of said doors.

5. A trap, comprising a pyramidal-shaped housing, doors pivotally mounted to the top of said housing, means for normally holding said doors in a closed position, and a guiding plate for regulating the movement of said doors and for filling openings left by said doors.

6. A device of the character described, comprising a housing, doors mounted in said housing with framework supporting said doors, guiding means for said doors pivotally mounted on said frame work and means for securing said frame work to said housing.

7. A device of the character described, comprising a housing formed with an inlet, a framework secured to said housing around said inlet, doors pivotally mounted to said framework for closing said inlet, means for normally holding said doors in a closed position, pivotally mounted plates provided with apertures mounted on said frame work at each end of said doors, and means secured to said doors passing through said apertures for guiding the movement of said doors and for holding said plates in position.

8. A device of the character described, comprising a trap body formed with an inlet, a frame secured to said trap body at said inlet, doors pivotally mounted in said frame, and positioned at an angle to the plane thereof, plates formed with slots therein pivotally mounted on said frame at the end of said doors, pins projecting from the ends of said doors through said plates, and means connecting said pins for normally holding said doors in a closed position.

9. A device of the character described, comprising a trap body formed with an inlet opening downward, a frame secured to said trap body around said inlet, a plurality of doors pivotally mounted on said frame, and adapted to swing downward, and horizontally acting elastic means connecting said doors for normally holding said doors in a closed position.

10. A device of the character described, comprising a trap body formed with an inlet, a framework secured to said body around said inlet, a plurality of doors pivotally mounted on said framework, elastic means for holding said doors normally closed, metallic plates pivoted on said framework at the ends of said doors, said plates being formed with arc-shaped slots, pins secured to said doors and projecting through said slots for communicating power from said elastic means to said doors.

In testimony whereof I affix my signature in presence of two witnesses.

ROBERT M. FRANKLIN.

Witnesses:
J. SINGER,
J. W. FONTAINE.